United States Patent [19]

Ozutsumi et al.

[11] 3,996,212

[45] Dec. 7, 1976

[54] FLUORAN COMPOUNDS

[75] Inventors: Minoru Ozutsumi; Yoshihide Miyazawa; Katsuichi Motohashi, all of Tokyo; Masatake Kiritani; Akio Watanabe, both of Fujimiya, all of Japan

[73] Assignees: Fuji Photo Film Co., Ltd., Minami-ashigara; Hodogaya Chemical Co., Ltd., Tokyo, both of Japan

[22] Filed: Jan. 9, 1975

[21] Appl. No.: 539,887

Related U.S. Application Data

[62] Division of Ser. No. 318,048, Dec. 26, 1972, Pat. No. 3,884,506.

[30] Foreign Application Priority Data

Dec. 24, 1971    Japan .............................. 46-104645

[52] U.S. Cl. .......................... 260/240 G; 260/335
[51] Int. Cl.² ..................................... C07D 493/10
[58] Field of Search ..................... 260/335, 240 G

[56]          References Cited
              UNITED STATES PATENTS

| | | |
|---|---|---|
| 3,654,314 | 4/1972 | Farber et al. ....................... 260/335 |
| 3,691,203 | 9/1972 | Koga et al. ......................... 260/335 |
| 3,694,461 | 9/1972 | Farber et al. ....................... 260/335 |
| 3,787,325 | 1/1974 | Hoover .......................... 260/335 X |
| 3,825,561 | 7/1974 | Akamatsu et al. ................. 260/335 |
| 3,947,471 | 3/1976 | Akamatsu et al. ................. 260/335 |

*Primary Examiner*—Norma S. Milestone
*Attorney, Agent, or Firm*—Sughrue, Rothwell, Mion, Zinn & Macpeak

[57]                ABSTRACT

A pressure-sensitive copying paper comprising an adsorbent solid acid and a microencapsulated color former capable of forming a distinct color when reacted with the adsorbent acid coated on the same or a different surface of a support or supports, the microencapsulated color former being at least one fluoran compound represented by the formula;

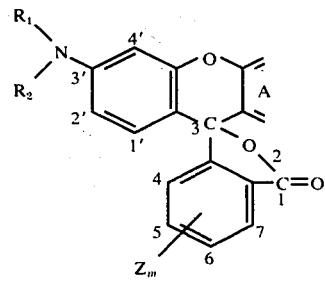

wherein $R_1$, $R_2$, $Z$, $m$ and

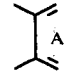

are as defined hereinafter, is disclosed.

1 Claim, No Drawings

FLUORAN COMPOUNDS

This is a division of application Ser. No. 318,048, filed Dec. 26, 1972, and now U.S. Pat. No. 3,884,506.

BACKGROUND OF THE INVENTION

1. Field of the Invention

The present invention relates to a pressure-sensitive copying paper, more particularly, to a pressure-sensitive copying paper having a microcapsule layer containing a novel fluoran compound as a color former.

2. Description of the Prior Art

Pressure-sensitive copying papers generally comprise a transfer sheet having thereon a layer of fine capsules containing a solution of an electron donating colorless organic compound (hereinafter referred to as a "color former") in an organic solvent, and a receiving sheet having thereon a layer of an electron accepting solid. A suitable binder is generally used for coating the electron accepting solid.

When both sheets are put together in such a manner that the electron donating layer is brought into contact with the electron accepting layer and localized pressure is applied to the combination of sheets by handwriting or typewriting, the capsules are ruptured and the colorless color former contained in the capsules is adsorbed by the electron accepting solid, which is usually a solid acid, to form a color.

Pressure-sensitive copying paper systems comprising the aforesaid transfer sheet (hereinafter referred to as an "upper sheet") and a receiving sheet (hereinafter referred to as a "lower sheet") and an intermediate sheet (hereinafter referred to as a "middle sheet") are also known. In these systems, the middle sheet is usually coated, on opposite surfaces, with a layer of microcapsules containing a color former solution and with a layer of a solid acid and a binder, respectively.

Another type of pressure-sensitive copying system is a recording sheet which can be prepared by applying the above described microcapsules and the adsorbent solid acid on the same surface of a support.

The solid acid used in conventional types of pressure-sensitive copying papers includes active clay substances such as acid clay, attapulgite, zeolite, bentonite and the like, solid organic acids such as succinic acid, tannic acid, benzoic acid and the like, and acidic organic polymers such as phenol-formaldehyde polycondensates, phenol-acetylene copolymers, styrene-maleic anhydride copolymers containing residual acidic radicals, salicylic acid-formaldehyde polycondensates and the like.

The organic solvent for dissolving the color former which is conventionally used includes, for example, ethylene glycol, chlorobenzene, chlorodiphenyl, diethyl phthalate, trioctyl phosphate and alkylnaphthalene.

SUMMARY OF THE INVENTION

One object of the present invention is to provide pressure-sensitive copying papers containing as a color former a fluoran compound which forms a reddish violet, dark reddish-violet, violet, dark violet, dark green or dark bluish-black color having excellent light-fastness when it is brought into contact with a solid acid.

Another object of the present invention is to provide pressure-sensitive copying papers which can be colored black by using a fluoran compound in combination with other known color formers.

According to the present invention, the above objects are achieved by a pressure-sensitive copying paper containing as a color former a fluoran compound represented by the formula:

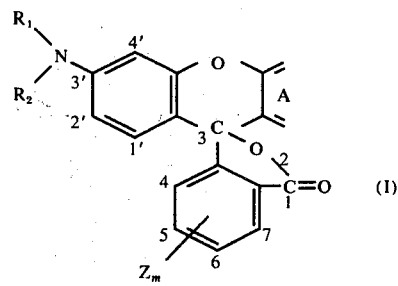

(I)

wherein $R_1$ represents a hydrogen atom or a lower alkyl group containing 1 to 4 carbon atoms; $R_2$ represents a lower alkyl group containing 1 to 4 carbon atoms; Z represents a hydrogen atom, chlorine atom or nitro group; m represents an integer of from 1 to 4; and

represents a naphthalene ring of the structure

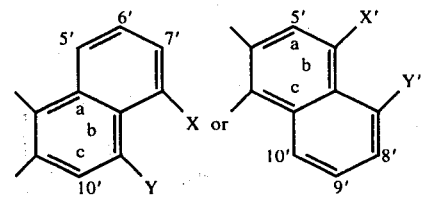

wherein one of X and Y represents a hydrogen atom and the other represents amino, monomethylamino, dimethylamino groups or —N=CH—B; one of X' and Y' represents a hydrogen atom and the other represents —N=CH—B; wherein B represents a lower alkyl group containing 1 to 7 carbon atoms, propenyl, styryl, phenyl or naphthyl group, and wherein said phenyl or naphthyl group may be substituted with one or more of a methyl, methoxy, hydroxy, dimethylamino, nitro group or chlorine atom.

DETAILED DESCRIPTION OF THE INVENTION

As the result of detailed investigations on color formers for use in pressure-sensitive copying papers, the inventors found that pressure-sensitive papers capable of being colored reddish-violet, dark reddish-violet, violet, dark violet, dark green, dark bluish-black or a like color, can be obtained by using a color former one or more novel fluoran compounds represented by general formula (I), and that a pressure-sensitive copying paper capable of being colored black can be obtained by the combined use of the novel fluoran compound and known color formers such as o-hydroxybenzalacetophenone, Rhodamine B-anilinolactam, Malachite Green lactone, Crystal Violet lactone and benzoyl leucomethylene blue.

A pressure-sensitive copying paper wherein the novel fluoran compound represented by general formula (I) is used as a color former is colorless or extremely slightly colored before color formation, but when brought into contact with a color developer the paper immediately colors reddish-violet, dark reddish-violet, violet, dark violet, dark green, dark bluish-black, or a like color with a high color density. The light-fastness of the color formed is excellent.

On the other hand, a pressure-sensitive copying paper capable of being colored black, wherein a color former of the invention capable of forming a dark color is used in combination with one of the aforesaid known color formers, is colored black immediately when brought into contact with a color developer, the color exhibiting high density and an extremely small change in color tone after color formation.

Several specific examples of fluoran compound color formers as are used in the pressure-sensitive copying paper of the present invention, generally represented by general formula (I), and synthesis examples of the same, will now be illustrated. The present invention is, of course, not to be construed as limited thereto.

| COLOR FORMER | $R_1$ | $R_2$ | Z | m | GENERAL FORMULA | CHEMICAL NAME |
|---|---|---|---|---|---|---|
| No. 1 | $C_2H_5$ | $C_2H_5$ | H | 1 | | 3'-diethylamino-9'-amino-benzo(a)-fluoran |
| No. 2 | $C_2H_5$ | $C_2H_5$ | H | 1 | | 3'-diethylamino-9'-methylamino-benzo(a)-fluoran |
| No. 3 | H | $C_2H_5$ | Cl | 4 | | 3'-ethylamino-9'-amino-benzo(a)-4,5,6,7-tetrachloro-fluoran |
| No. 4 | $C_2H_5$ | $C_2H_5$ | H | 1 | | 3'-diethylamino-8'-amino-benzo(a)-fluoran |
| No. 5 | $CH_3$ | $CH_3$ | Cl | 4 | | 3'-dimethylamino-8'-methylamino-benzo(a)-4,5,6,7-tetrachloro-fluoran |
| No. 6 | $C_2H_5$ | $C_2H_5$ | H | 1 | | 3'-diethylamino-8'-dimethylamino-benzo(a)-fluoran |

-continued

| COLOR FORMER | $R_1$ | $R_2$ | Z | m | GENERAL FORMULA (A) | CHEMICAL NAME |
|---|---|---|---|---|---|---|
| No. 7 | $C_2H_5$ | $C_2H_5$ | H | 1 | naphthyl-N=CH—CH$_3$ | 3'-diethylamino-9'-ethylideneamino-benzo(a)-fluoran |
| No. 8 | $C_2H_5$ | $C_2H_5$ | H | 1 | naphthyl-N=CH—C(C$_2$H$_5$)(H)—(CH$_2$)$_3$—CH$_3$ | 3'-diethylamino-9'-(2''-ethyl-hexylideneamino)-benzo(a)-fluoran |
| No. 9 | $C_2H_5$ | $C_2H_5$ | H | 1 | naphthyl-N=CH—CH=CH—CH$_3$ | 3'-diethylamino-9'-(2''-butenylidene-amino)-benzo(a)-fluoran |
| No. 10 | $C_2H_5$ | $C_2H_5$ | H | 1 | naphthyl-N=CH—CH=CH—phenyl | 3'-diethylamino-9'-cinnamylidene-amino-benzo(a)-fluoran |
| No. 11 | $C_2H_5$ | $C_2H_5$ | H | 1 | naphthyl-N=CH—phenyl | 3'-diethylamino-9'-benzylidene-amino-benzo(a)-fluoran |
| No. 12 | $C_2H_5$ | $C_2H_5$ | H | 1 | naphthyl-N=CH—C$_6$H$_4$—CH$_3$ | 3'-diethylamino-9'-(p-methyl-benzylideneamino)-benzo(a)-fluoran |
| No. 13 | $C_2H_5$ | $C_2H_5$ | H | 1 | naphthyl-N=CH—C$_6$H$_4$—OCH$_3$ | 3'-diethylamino-9'-(p-methoxy-benzylideneamino)-benzo(a)-fluoran |

-continued

| COLOR FORMER | $R_1$ | $R_2$ | Z | m | GENERAL FORMULA 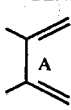 | CHEMICAL NAME |
|---|---|---|---|---|---|---|
| No. 14 | $C_2H_5$ | $C_2H_5$ | H | 1 | 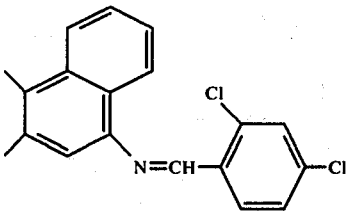 | 3'-diethylamino-9'-(m-nitro-benzylideneamino)-benzo(a)-fluoran |
| No. 15 | H | $C_2H_5$ | Cl | 4 | | 3'-ethylamino-9(2'',4''-dichloro-benzylideneamino)-benzo(a)-4,5,6,7-tetrachloro-fluoran |
| No. 16 | $C_2H_5$ | $C_2H_5$ | H | 1 | 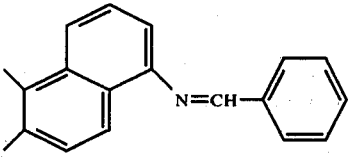 | 3'-diethylamino-8'-benzylidenamino-benzo(a)-fluoran |
| No. 17 | $C_2H_5$ | $C_2H_5$ | H | 1 | 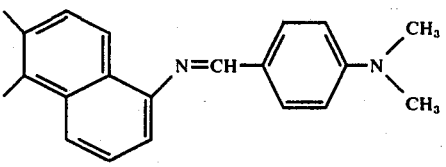 | 3'-diethylamino-7'-(p-dimethylamino-benzylideneamino)-benzo(c)-fluoran |
| No. 18 | $C_4H_9$ | $C_4H_9$ | $NO_2$ | 1 | 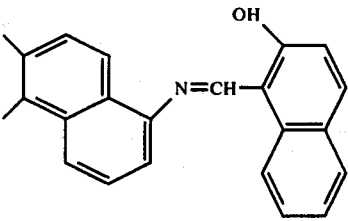 | 3'-dibutyl-7'-(o-hydroxy-alpha-naphthylmethyleneamino)-benzo(c)-5(6)-nitro-fluoran |

To illustrate the general synthesis conditions used in the present invention, the following three exemplary processes are given.

1. The color former represented by general formula (I) can be obtained by reacting 1.0 mole of benzoyl-benzene represented by the general formula;

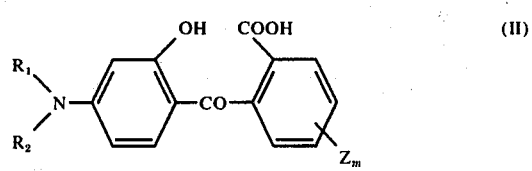

(II)

wherein $R_1$, $R_2$, Z and m are the same as defined in general formula (I), with 1.0 – 1.5 moles of a naphthol represented by the general formula;

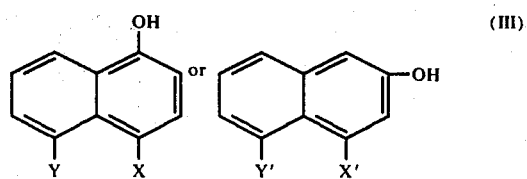

(III)

wherein X, Y, X' and Y' are the same as defined in general formula (I), at a temperature of from 20° to 200° C for 1 – 10 hours in the presence of a condensing agent such as concentrated sulfuric acid, fuming sulfuric acid, polyphosphoric acid, zinc chloride, or the like, pouring the reaction product into ice-water, adjusting the pH to 12 with an aqueous sodium hydroxide solution, extracting the dye precipitated per se with an organic solvent such as benzene, chloroform, etc., and then distilling off the solvent under reduced pressure. If necessary, the resulting color former can be recrystallized using any standard procedure known to the art.

2. The color former represented by the general formula (I) can be obtained by reacting 1.0 mole of benzoylnaphthalene represented by the general formula;

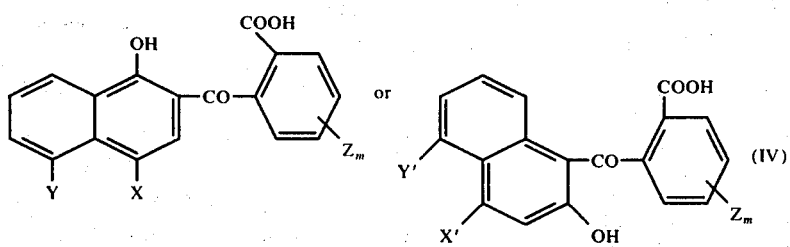

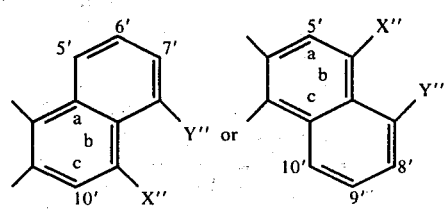

wherein one of X'' and Y'' represents a hydrogen atom and the other represents an amino group, with 1.0 – 5.5 moles of an aldehyde compound represented by the general formula;

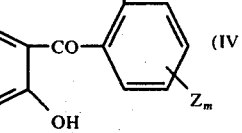

wherein X, Y, X' and Y' are the same as defined above in general formula (I); and Z and m are the same as defined in general formula (I), and 1.0 – 1.5 moles of aminophenol represented by the general formula;

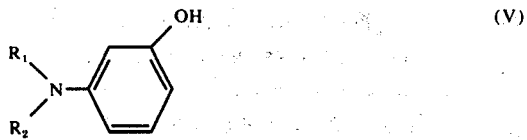

wherein $R_1$ and $R_2$ are the same as defined in general formula (I), in the same manner as described in the first synthesis above. If necessary, the resulting dye can be recrystallized.

3. The color former represented by general formula (I) can be obtained by reacting 1.0 mole of a fluoran compound represented by the general formula;

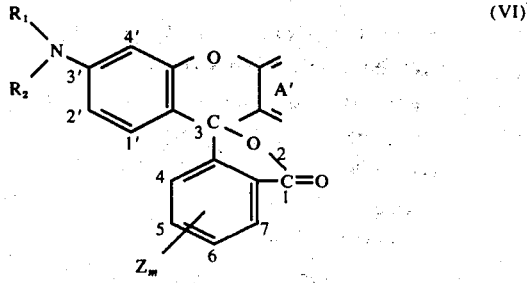

wherein $R_1$, $R_2$, Z and m are the same as defined in general formula (I), and where

represents a naphthalene ring of the structure wherein B is the same as defined in general formula (I), at a temperature of from 20° to 130° C for 5 – 10 hours in a volatile organic solvent such as methanol, ethanol, chloroform, benzene, toluene, chlorobenzene, etc. and, if necessary, in the presence of a basic material such as triethylamine, pyridine and quinoline, or glacial acetic acid, as a catalyst, pouring the reaction product into a cold water, rendering the resulting mixture alkaline with an aqueous sodium hydroxide solution, filtrating out the precipitate formed or extracting the precipitate with chloroform, benzene, toluene or chloroform, and distilling off the solvent under reduced pressure. If necessary, the resulting color former can be recrystallized.

Specific synthesis examples are given below for several color formers. In the following description, all parts are by weight unless otherwise specified.

Synthesis example 1 (Color former No. 1)

10.4 parts of 2-hydroxy-4-diethylamino-1-(2'-carboxybenzoyl)-benzene and 5.3 parts of 4-amino-1-naphthol were reacted at a temperature of 20° – 30° C for 10 hours in 50 parts of 95% sulfuric acid. Thereafter, the reaction product was poured into 500 parts of ice-water, and the pH was adjusted to 12 with an aqueous sodium hydroxide solution. 100 parts of benzene was added thereto and the system well stirred to extract the precipitated dye into the benzene layer, and the benzene layer then separated and treated with carbon. Benzene was then distilled off and the residue remaining recrystallized from benzene-petroleum ether. There was thus obtained 12.0 parts of a greenish-light brown color former having a melting point of 234° – 235° C.

Synthesis example 2 (Color formers No. 2, No. 4, No. 5 and No. 6)

Compounds of general formulae (II) and (III) corresponding to each of the above-described color formers were allowed to react in the same manner as in Synthesis example 1. The respective color formers were thus obtained as slightly colored crystals. The melting point and the appearance of the crystals of the color formers so obtained are tabulated below.

| Color former | Melting point (° C) | Appearance of crystal |
| --- | --- | --- |
| No. 2 | 188 – 190 | Light yellowish brown |
| No. 4 | 220 – 221 | Light purplish white |
| No. 5 | 190 – 193 | Light brown |
| No. 6 | 180 – 184 | Light yellow |

Synthesis example 3 (Color former No. 3)

4.5 parts of 1-hydroxy-4-amino-2-(2'-carboxy-3',4',5',6'-tetrachlorobenzoyl)-naphthalene was reacted with 1.5 parts of 3-ethylaminophenol in 15 parts of polyphosphoric acid at a temperature of 100° – 105° C for 4 hours. The resulting reaction product was treated in the same manner as in Synthesis example 1. There was thus obtained 3.2 parts of a light brown color former having a melting point of 289° – 292° C.

Synthesis example 4 (Color former No. 11)

3.0 parts of 3'-diethylamino-9'-amino-benzo(a)-fluoran and 1.5 parts of benzaldehyde were added to 100 parts of benzene. Further, 0.1 part of glacial acetic acid was added thereto. After refluxing the resulting mixture for 5 hours on a water bath, the reaction product was added to 500 parts of cold water. The pH of the mixture was then adjusted to 12 with an aqueous sodium hydroxide solution. The benzene layer formed was separated, washed with water and treated with carbon. Thereafter, benzene was distilled off and the residue recrystallized from benzene-petroleum ether. There was thus obtained 3.1 parts of a light yellowish-green color former having a melting point of 208° – 212° C.

Synthesis example 5 (Color formers No. 7 through No. 10 and No. 12 through No. 18)

Compounds of general formulae (VI) and (VII) corresponding to each of the color formers desired were reacted with each other and treated in the same manner as in Synthesis example 4 in the presence of the solvent and catalyst set out below. The respective color formers were thus obtained in a slightly colored form. The solvents and catalysts used, the melting points and the appearance of the crystals of the resulting color formers are tabulated below.

In the production of a pressure-sensitive copying paper using a fluoran compound represented by general formula (I) as a color former, the process described in U.S. Pat. Nos. 2,800,457 and 2,800,458, well known to the art, that is, the process for producing microcapsules utilizing the phenomenon of complex coacervation, is employed. In general, the color former is used in an amount of 0.5–5.0% by weight based on the aforesaid organic solvent such as ethylene glycol, chlorobenzene, chlorodiphenyl, diethyphthalate, trioctyl phosphate, alkylnaphthalene, etc.

Pressure-sensitive copying papers utilizing representative fluoran compound color formers within general formula (I) will be described below as in several Examples. In the following Examples all parts are by weight, unless otherwise specified.

EXAMPLE 1

2.0 parts of each of color formers No. 1 to No. 3 was treated as follows. Each of the color formers was dissolved in 100 parts of trichlorodiphenyl and, at 50° C, 20 parts of gum arabic and 160 parts of water were added thereto and an emulsion formed. To the resulting emulsion were added 20 parts of acid-processed gelatin and 160 parts of water and, with stirring, acetic acid was added thereto to adjust the pH to 5. Thereafter, 500 parts of water was added thereto to accelerate coacervation to form a dense liquid film of gelatin-gum arabic around the oil droplets of trichlorodiphenyl containing the color former. After adjusting the pH to 4.4, 3.8 parts of a 37% formalin aqueous solution was added thereto to harden the liquid film. Thereafter, the mixture was cooled to 10° C, the pH was adjusted to 9 with an aqueous sodium hydroxide solution, and the mixture was allowed to stand for 5 – 6 hours, whereby encapsulation was completed. The resulting encapsulated solution was applied to a paper (any a coating method used in this art can be used, e.g., roll-coating, air-knife coating, etc.) and dried. There was thus, obtained a colorless coated paper (upper sheet). When the resulting upper sheet was closely placed in face to face alignment on a lower sheet coated with an active clay substance as a color developer and a localized pressure was applied to the combination of sheets by hardwriting, the lower sheet immediately colored dark bluish-black at the pressed area, and almost no fading of the dark bluish-black color formed was encountered even when the colored area was directly exposed to sunlight for a long period of time. Further, when the upper sheet was closely placed in face to face alignment on a lower sheet coated with an acidic organic polymer as a color developer and localized pressure

| Color former | Solvent | Catalyst | M.P. (° C) | Appearance of crystals |
| --- | --- | --- | --- | --- |
| No. 7 | Ethanol | Pyridine | 271 – 273 | Light brown |
| No. 8 | " | " | 234 – 238 | Light brown |
| No. 9 | " | " | 253 – 254 | Light brown |
| No. 10 | " | " | 244 – 247 | Light brown |
| No. 12 | Benzene | Glacial acetic acid | 206 – 208 | Light yellowish green |
| No. 13 | " | " | 205 – 208 | Light yellowish green |
| No. 14 | " | " | 211 – 215 | Light yellowish green |
| No. 15 | Chloroform | Triethylamine | 203 – 208 | Light brown |
| No. 16 | Benzene | Glacial acetic acid | 203 – 205 | Light yellow |
| No. 17 | Toluene | " | 105 – 107 | Light yellow |
| No. 18 | Benzene | " | 151 – 156 | Light brown | was applied to the combination of sheets by handwriting, the lower sheet immediately colored dark green at the pressed area.

On the other hand, color formers corresponding to color formers No. 1 to No. 3 were prepared with the use of beta-naphthol, and were treated in the same manner as above to obtain the respective upper sheets. When each of the resulting upper sheets was closely placed in face to face alignment on a lower sheet coated with an active clay substance and localized pressure was applied to the combination of sheets by handwriting, the lower sheet was immediately colored dark reddish-violet at the pressed area, but, when exposed to sunlight directly for several hours, the dark reddish-violet color changed to a dark yellowish-brown color.

In the following examples, when it is indicated that color formers were "treated in the same manner as in Example 1" this signifies that the color formers were microencapsulated using the procedure of Example 1.

EXAMPLE 2

2.0 parts of color formers No. 7 to No. 15 were treated in the same manner as in Example 1, applied to a paper and dried to obtain a colorless upper sheet. When the resulting upper sheet was closely placed in face to face alignment on a lower sheet coated with an active clay substance as a developer and a localized pressure was applied to the combination of sheets by handwriting, the lower sheet immediately colored dark bluish-black at the pressed area, and almost no fading of the dark bluish-black color formed was recognized even when the sheet was directly exposed to sunlight for a long period of time. Further, when the upper sheet was closely placed in face to face alignment on a lower sheet coated with an acidic organic polymer as a color developer and localized pressure was applied to the combination of the sheets by handwriting, the lower sheet immdiately colored dark violet at the pressed areas.

EXAMPLE 3

2.0 parts of color formers No. 4 to No. 6 and No. 16 were treated in the same manner as in Example 1, applied to a paper, and dried to obtain a colorless upper sheet. When the resulting upper sheet was closely placed in face to face alignment on a lower sheet coated with an acidic organic polymer, active clay substance or a mixture thereof as a color developer and localized pressure was applied to the combination of the sheets by handwriting, the lower sheet immediately colored reddish-violet to dark reddish-violet at the pressed areas, and the reddish-violet to dark reddish-violet color showed sufficient stability with lapse of time to be practically useful.

On the other hand, color formers corresponding to color formers No. 4 to No. 6 were prepared with the use of beta-naphthol, and were subsequently treated in the same manner as in Example 1 to obtain respective upper sheets. When each of the resulting upper sheets was closely placed in face to face alignment on a lower sheet coated with an active clay substance and localized pressure was applied to the combination of the sheets by handwriting, the pressed areas of lower sheet immediately colored red to reddish-violet color. However, when the sheets were directly exposed to sunlight for several hours, the red to reddish-violet color changed to a yellowish-brown color.

EXAMPLE 4

2.0 parts of color formers No. 17 and No. 18 were treated in the same manner as in Example 1, applied to a paper and dried to obtain a colorless upper sheet. When the resulting upper sheet was closely placed in face to face alignment on a lower sheet coated with an acidic organic polymer, an active clay substance or a mixture thereof as a color developer and localized pressure was applied to the combination of the sheets by handwriting, the lower sheet immediately colored violet to dark violet at the pressed areas, and the violet to dark violet color thus formed exhibited enough stability with the passage of time to be practically useful.

EXAMPLE 5

3.0 parts of color former No. 11, 0.3 part of o-hydroxybenzalacetophenone, 0.1 part of Rhodamine B-anilinolactam, 0.1 part of Malachite Green lactone and 0.2 part of benzoyl leucomethylene blue were treated in the same manner as in Example 1 and applied to a paper to prepare an upper sheet. When the resulting upper sheet was closely placed in face to face alignment on a lower sheet coated with an active clay substance as a color developer and localized pressure was applied to the combination of the sheets by handwriting, the lower sheet immediately colored black at the pressed areas, and the color showed little change in tone with the passage of time.

EXAMPLE 6

A colorless upper sheet was obtained by treating 3.0 parts of color former No. 2, 0.25 parts of o-hydroxybenzalacetophenone, 0.2 part of Rhodamine B-anilinolactam, 1.0 part of Crystal Violet lactone and 0.5 part of benzoyl leucomethylene blue in the same manner as in Example 1, applying the microcapsule system to a paper and drying the paper. When the resulting upper sheet was closely placed in face to face alignment on a lower sheet coated with an active clay substance as a color developer and localized pressure was applied to the combination of the sheets by handwriting, the lower sheet immediately colored black at the pressed areas. Almost no fading of the black color formed was seen even upon exposure to direct sunlight for a long period of time.

While the invention has been described in detail and with reference to specific embodiments thereof, it will be apparent to one skilled in the art that various changes and modifications can be made therein without departing from the spirit and scope thereof.

What is claimed is:

1. Fluoran compounds represented by the formula:

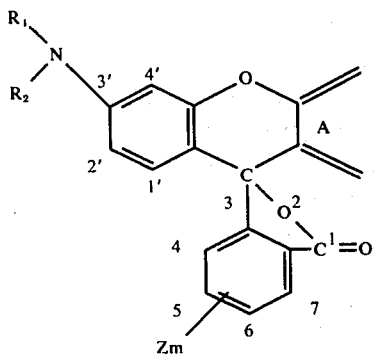

wherein $R_1$ represents a hydrogen atom or a lower alkyl group containing 1 to 4 carbon atoms; $R_2$ represents a lower alkyl group containing 1 to 4 carbon atoms; Z represents one or more of a hydrogen atom, chlorine atom or nitro group; m represents an integer of from 1 to 4; and

represents a naphthalene ring of the formula;

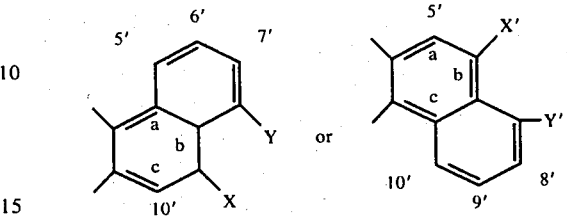

wherein one of X and Y represents a hydrogen atom and the other represents an —N=CH—B group; one of X' and Y' represents a hydrogen atom and the other represents —N=CH—B group; wherein B represents a lower alkyl group containing 1 to 7 carbon atoms, propenyl, styryl, phenyl or naphthyl group, and where said phenyl or naphthyl group may be substituted with methyl, methoxy, hydroxy, dimethylamino, nitro group or chlorine atom.

* * * * *